(12) United States Patent
Herrin et al.

(10) Patent No.: US 11,781,631 B2
(45) Date of Patent: Oct. 10, 2023

(54) MAGNETIC DRIVE MOTOR ASSEMBLY AND ASSOCIATED METHOD OF USE

(71) Applicant: MagnaMotor, LLC, Tampa, FL (US)

(72) Inventors: Robert Herrin, Orlando, FL (US); Sean R. Khant, Tampa, FL (US)

(73) Assignee: MagnaMotor, LLC, Tampa, FL (US)

( * ) Notice: Subject to any disclaimer, the term of this patent is extended or adjusted under 35 U.S.C. 154(b) by 97 days.

(21) Appl. No.: 17/395,812

(22) Filed: Aug. 6, 2021

(65) Prior Publication Data

US 2021/0364072 A1 Nov. 25, 2021

Related U.S. Application Data

(62) Division of application No. 17/177,893, filed on Feb. 17, 2021, now Pat. No. 11,111,991.

(60) Provisional application No. 62/977,568, filed on Feb. 17, 2020.

(51) Int. Cl.
| | |
|---|---|
| *F16H 37/12* | (2006.01) |
| *H02K 7/075* | (2006.01) |
| *H02K 11/24* | (2016.01) |
| *F16H 25/14* | (2006.01) |
| *H02K 7/116* | (2006.01) |

(52) U.S. Cl.
CPC .......... *F16H 37/124* (2013.01); *F16H 25/14* (2013.01); *H02K 7/075* (2013.01); *H02K 7/116* (2013.01); *H02K 11/24* (2016.01); *F16H 2702/00* (2013.01)

(58) Field of Classification Search
CPC ........ H02K 7/116; H02K 11/24; H02K 7/075; F16H 25/14; F16H 37/124; F16H 21/28
See application file for complete search history.

(56) References Cited

U.S. PATENT DOCUMENTS

| | | | |
|---|---|---|---|
| 3,899,703 A | 8/1975 | Kinnison | |
| 4,384,221 A | 5/1983 | Brandly | |
| 4,733,572 A * | 3/1988 | Kobayashi | G06K 7/14 |
| | | | 74/44 |
| 4,926,033 A * | 5/1990 | Kobayashi | F16H 21/28 |
| | | | 235/475 |
| 8,336,409 B2 | 12/2012 | Edwards | |
| 8,508,089 B2 | 8/2013 | Edwards et al. | |
| 8,664,816 B1 | 3/2014 | Edwards et al. | |
| 2005/0116567 A1 | 6/2005 | Limb | |
| 2007/0210659 A1* | 9/2007 | Long | H02K 49/10 |
| | | | 310/80 |

OTHER PUBLICATIONS

International Preliminary Report on Patentability dated Sep. 1, 2022 for corresponding International Patent Application No. PCT/US2021/018362 with an international filing date of Feb. 17, 2021.
International Search Report dated May 6, 2021 for corresponding International Application No. PCT/US 21/18362 with an international filing date of Feb. 17, 2021.

* cited by examiner

*Primary Examiner* — Terence Boes
(74) *Attorney, Agent, or Firm* — Molly L. Sauter; Smith & Hopen, P.A.

(57) ABSTRACT

An input cam having a recessed track for establishing a desired dwell time for a plurality of rotatable permanent magnets and an output cam having a recessed track for maximizing the harnessing of linear motion energy and to apply the harnessed energy to a rotary output are provided to improve the efficiency of a magnetic transmission.

19 Claims, 7 Drawing Sheets

MAGNETIC DRIVE MOTOR ASSEMBLY AND ASSOCIATED METHOD OF USE

CROSS-REFERENCE TO RELATED APPLICATIONS

This application claims priority to, and is a divisional application of, currently pending U.S. Non-Provisional patent application Ser. No. 17/177,893 filed on Feb. 17, 2021 and entitled "Magnetic Drive Motor Assembly and Associated Method of Use", which claims priority to U.S. Provisional Patent Application No. 62/977,568 filed on Feb. 17, 2020 and entitled "Magnetic Drive Motor Assembly and Associated Method of Use", the contents of both which are herein incorporated by reference in their entirety.

BACKGROUND OF THE INVENTION

Magnetically driven motors are known in the art in which a rotating set of magnets are influenced by attractive and repulsive forces created by opposing magnets. In one magnetically driven motor known in the art, a permanent magnet is rotated about an axis extending between opposing north and south poles. The magnetic field of the rotated permanent magnet interacts with magnetic fields of the permanent magnets carried by a magnetic shuttle for repelling and attracting the fixed permanent magnets, thereby providing a linear reciprocating movement of the magnetic shuttle responsive to the rotary motion of the rotated permanent magnet.

While it is known in the art to use a direction of motion to convert a linear motion to a rotary motion and, in the alternative, to convert a rotary motion to a linear motion, there are inherent inefficiencies in these conversions.

Accordingly, what is needed in the art is an improved system and method that enhances the operation of known magnetic motors for improving efficiency of power sources and enhancing the power output from such motors.

SUMMARY OF INVENTION

In various embodiments, the present invention provides a magnetic transmission that operates economically and efficiently to provide power to a load. The various embodiments provide an input camshaft arrangement for transforming rotational motion to reciprocating motion and an output camshaft arrangement for transforming reciprocating motion to rotational motion.

In one embodiment to provide an efficient transformation of rotational motion to reciprocating motion, a camshaft arrangement is provided for establishing a dwell time of a plurality of rotatable permanent magnets of a magnetic drive train. In this embodiment, the camshaft arrangement includes an input cam comprising a recessed track to engage a cam roller of a crank arm and further comprising one or more supports to attach the input cam to a reciprocating shaft. The reciprocating shaft rotates a plurality of rotatable permanent magnets in response to a rotation of the crank arm that results in a reciprocating stroke of a shuttle comprising a plurality of fixed permanent magnets. In operation, the recessed track of the input cam is dimensioned to establish a desired dwell time of the plurality of rotatable permanent magnets during the reciprocating stroke of the shuttle.

In particular, the dwell time established by the recessed track of the input cam is sufficient to allow the shuttle to complete its reciprocating stroke. The dimensions of the recessed track of the input cam effectively provide for maximum magnetic alignment between the plurality of rotatable permanent magnets and the plurality of fixed permanent magnets of the shuttle during the reciprocating stroke of the shuttle.

In a specific embodiment, the width of the recessed track of the input cam at 0° and 180° positions is substantially equal to the diameter of the cam roller. Additionally, the width of the recessed track of the input cam at 90° and 270° positions is substantially equal to a swing of the crank arm.

By utilizing the input cam having a properly dimensioned recessed track, a continuous drive motor can be used to rotate a crank shaft coupled to the crank arm, thereby removing the need to utilize a servo motor to control the timing of the reciprocating shaft and shuttle motion.

In another embodiment to provide an efficient transformation of reciprocating motion to rotational motion, a camshaft arrangement for transforming a reciprocating input to a rotational output is provided. The camshaft arrangement includes an output cam having a recessed track to engage a cam roller of a reciprocating shaft. In this embodiment, the force produced by the reciprocating shaft fluctuates during a reciprocating stroke of the reciprocating shaft and the recessed track of the output cam is dimensioned to reduce the fluctuation in the force produced by the reciprocating shaft during the reciprocating stroke. In general, the recessed track of the output cam is dimensioned to maximize a transformation of energy generated by the reciprocating stroke of the reciprocating shaft to a rotational output.

In a particular embodiment, the recessed track of the output cam is dimensioned to provide a constant positive acceleration portion, a constant velocity portion and a constant negative acceleration portion to maximize the transformation of energy generated by the reciprocating stroke to a rotational output. More specifically, the constant positive acceleration portion of the recessed track of the output cam comprises approximately 20% of the recessed track, the constant velocity portion of the recessed track of the output cam comprises approximately 50% of the recessed track and the constant negative acceleration portion of the recessed track of the output cam comprises approximately 30% of the recessed track.

In another embodiment, the present invention provides a magnetic drive train apparatus including a plurality of rotatable permanent magnets, each of the rotatable permanent magnets having a north pole and an opposing south pole aligned within a plane and a plurality of first rotational shafts, wherein each one of the plurality of rotatable permanent magnets is rotatable by a respective one of the plurality of first rotational shafts about an axis within the plane and between the opposing poles. The magnetic drive train further includes a first reciprocating shaft coupled to the plurality of first rotational shafts, a shuttle comprising a plurality of fixed permanent magnets affixed to a shuttle, the plurality of fixed permanent magnets positioned such that a rotation of the plurality of rotatable permanent magnets causes an alternate repelling force and attracting force on the plurality of fixed permanent magnets that results in a reciprocating stroke of the shuttle parallel to the axis and a crank arm having a cam roller positioned at a first end of the crank arm. To provide the efficient transformation of rotational motion to reciprocating motion, the magnetic drive train includes an input cam coupled to the first reciprocating shaft, the input cam comprising a recessed track to engage the cam roller of the crank arm, wherein a rotation of the crank arm results in a reciprocating stroke of the first reciprocating shaft perpendicular to the axis and in the corresponding reciprocating stroke of the shuttle parallel to the axis and wherein the recessed track is dimensioned to establish a dwell time during the reciprocating stroke of the first reciprocating shaft. The magnetic drive train further includes a second reciprocating shaft coupled to the shuttle, the second reciprocating shaft comprising a cam roller. To provide an efficient transformation of reciprocating motion to rotational motion, the magnetic drive train further includes an output cam having a recessed track to engage the cam roller of the second reciprocating shaft, wherein a force produced by the reciprocating shaft fluctuates during a reciprocating stroke of the reciprocating shaft and wherein the recessed track of the output cam is dimensioned to reduce the fluctuation in the force produced by the reciprocating shaft during the reciprocating stroke of the second reciprocating shaft.

In the various embodiments of the present invention, an input cam and an output cam are provided to enhance the operation of known magnetic motors for improving efficiency of power sources and enhancing the power output from such motors.

BRIEF DESCRIPTION OF THE DRAWINGS

For a fuller understanding of the invention, reference should be made to the following detailed descriptions, taken in connection with the accompanying drawings, in which.

DETAILED DESCRIPTION OF THE INVENTION

The present invention will now be described more fully hereinafter with reference to the accompanying drawings, in which exemplary embodiments of the invention are shown. However, the illustrated embodiments are not intended to be limiting and are provided so that the disclosure is thorough and complete and fully conveys the scope of the invention as understood by one with ordinary skill in the art. Like numbers refer to like elements throughout the figures and accompanying detailed description.

In various embodiments, the present invention provides input and output camshaft arrangements for transforming between reciprocating magnetic driven motion and rotary magnetic driven motion in an efficient drive train.

Figure 1:
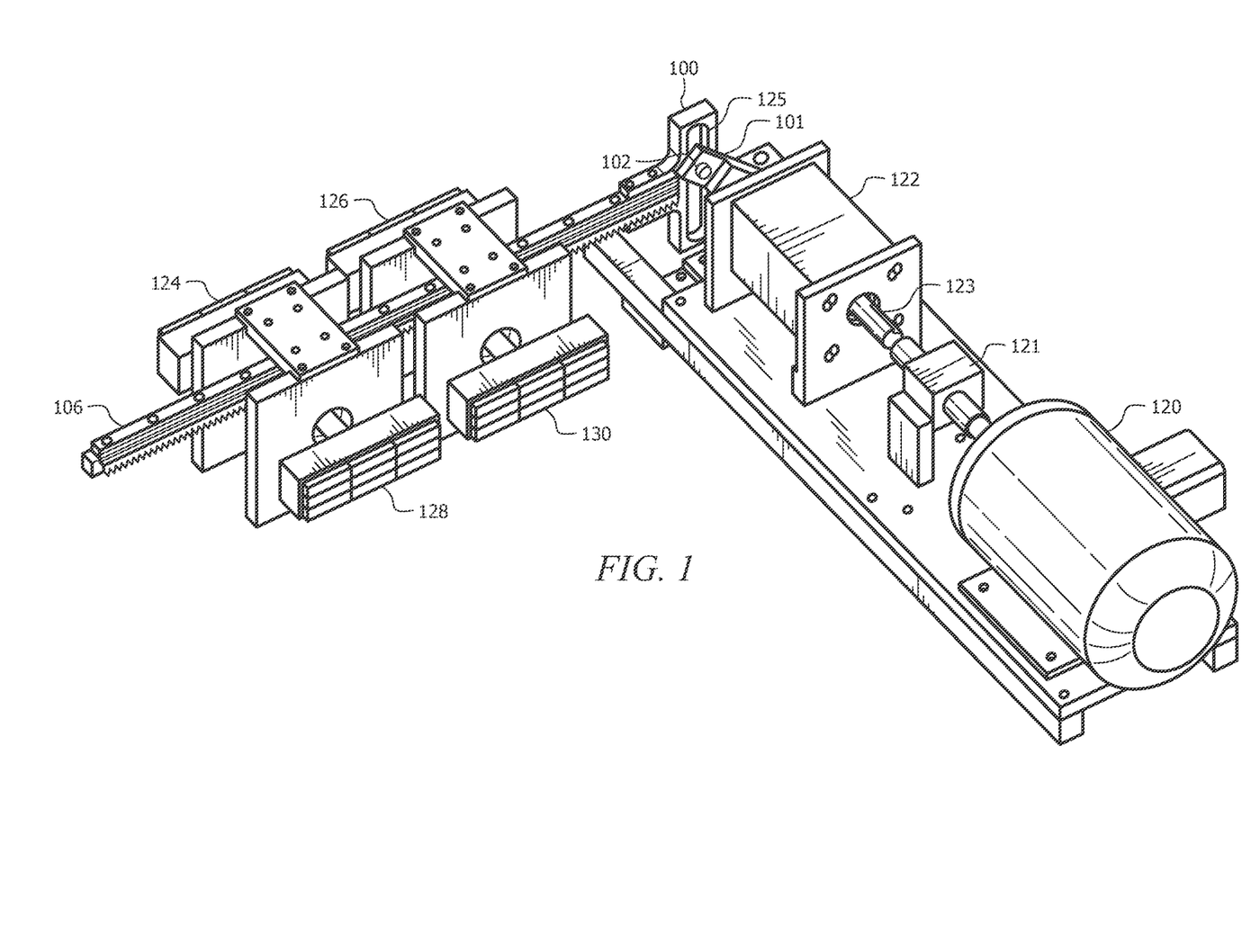
FIG. 1 is an illustration of a drive train comprising an input cam to provide a desired dwell time, in accordance with an embodiment of the present invention.

A first embodiment provides an improvement to an input cam for driving the rotary motion of the efficient drive train. As shown in FIG. 1, in one embodiment of the present invention, a magnetic transmission for motion conversion includes an improved drive train comprising a plurality of rotatable permanent magnets 124, 126, 128, 130 coupled to a reciprocating shaft 106. The embodiment further includes a camshaft arrangement including an input cam 100 for controlling the positioning and dwell time of the plurality of rotatable permanent magnets 124, 126, 128, 130. Each of the rotatable permanent magnets 124, 126, 128, 130 includes a north pole and an opposing south pole and are rotatable about a common axis. The rotatable permanent magnets 124, 126, 128, 130 are rotated about the common axis using the input cam 100, a crank arm 101, and a cam roller 102 driven by a continuous drive motor 120. The electric motor 120 is coupled to an output shaft 123, which is coupled to the crank arm 101 to drive the movement of the rotatable permanent magnets 124, 126, 128, 130 using the linear shaft 106. The revolutions per minute (rpm) of the continuous drive motor 120 may be reduced using a gear reducer 122. A torque transducer 121 is used for measuring the input torque during testing. The cam roller 102 of the crank arm 101 is positioned within a recessed track 125 provided by the input cam 100. The recessed track 125 is dimensioned to establish the dwell time of the plurality of rotatable permanent magnets 124, 126, 128, 130 during the reciprocating stroke of a shuttle (not shown in this view).

In operation, the continuous drive motor 120 drives the crank arm 101 using the output shaft 123, which causes the cam roller 102 to follow along the recessed track 125 provided by the input cam 100, thereby causing the linear shaft 106 to move in a linearly reciprocating motion, which results in the rotatable permanent magnets 124, 126, 128, 130 rotating 180°, and then reversing 180°, with the movement of the linear shaft 106.

Figure 2:
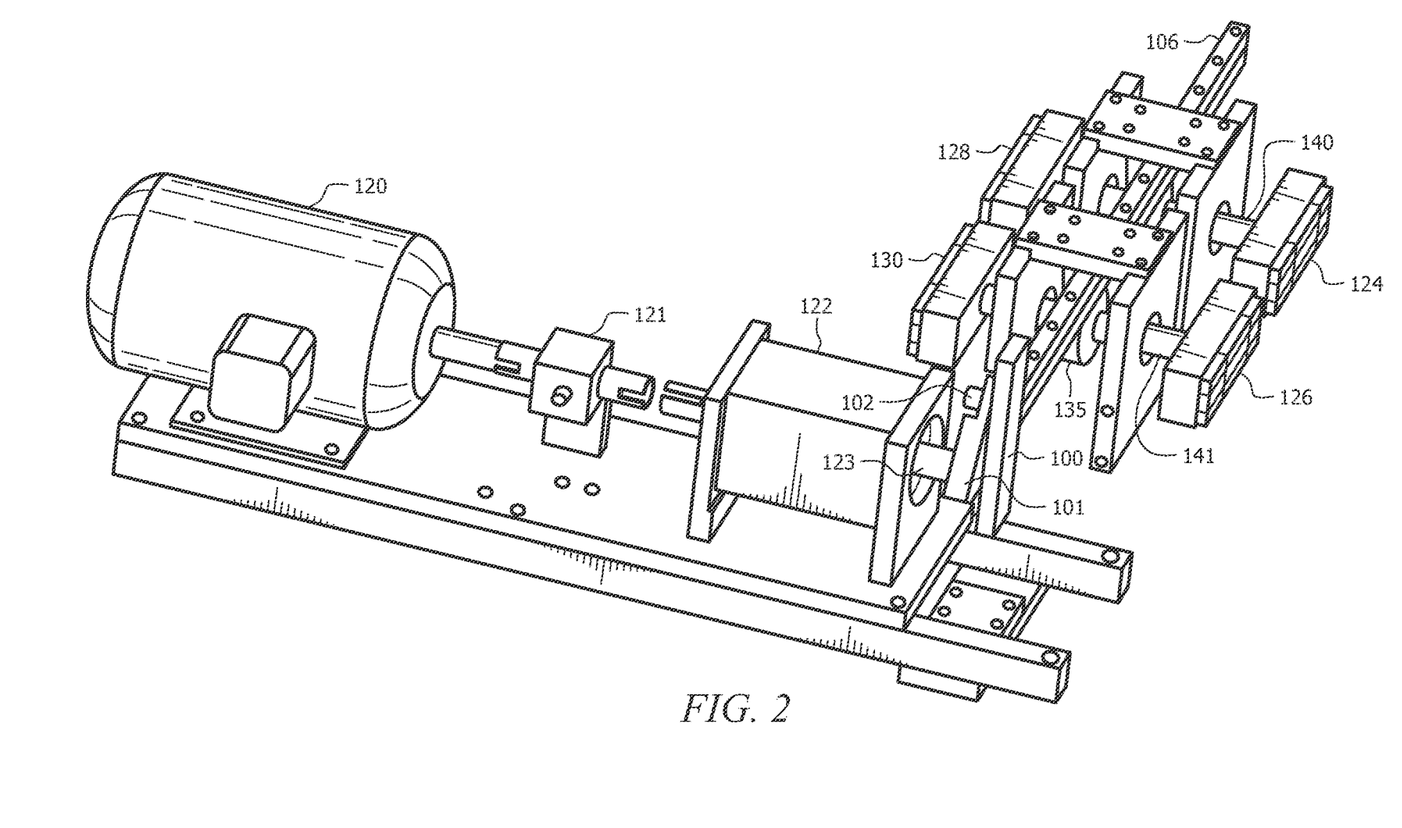
FIG. 2 is an alternative view of the drive train illustrated in FIG. 1

An additional view of the magnetic transmission is shown in FIG. 2, which more clearly illustrates the output shaft 130 that is coupled to the crank arm 101 and driven by the electric motor 120 to affect the reciprocation of the linear shaft 106 and the corresponding rotation of the rotatable permanent magnets 124, 126, 128, 130. As shown in FIG. 2, the rotational movement of the rotatable permanent magnets 124, 126, 128, 130 is accomplished using a gear 135 engaged with a gear rack 106 to rotate a first and second rotatable permanent magnet 124, 128 about a first common axis 140 and to rotate a third and fourth rotatable permanent magnet 126, 130 about a second common axis 141.

Figure 3:
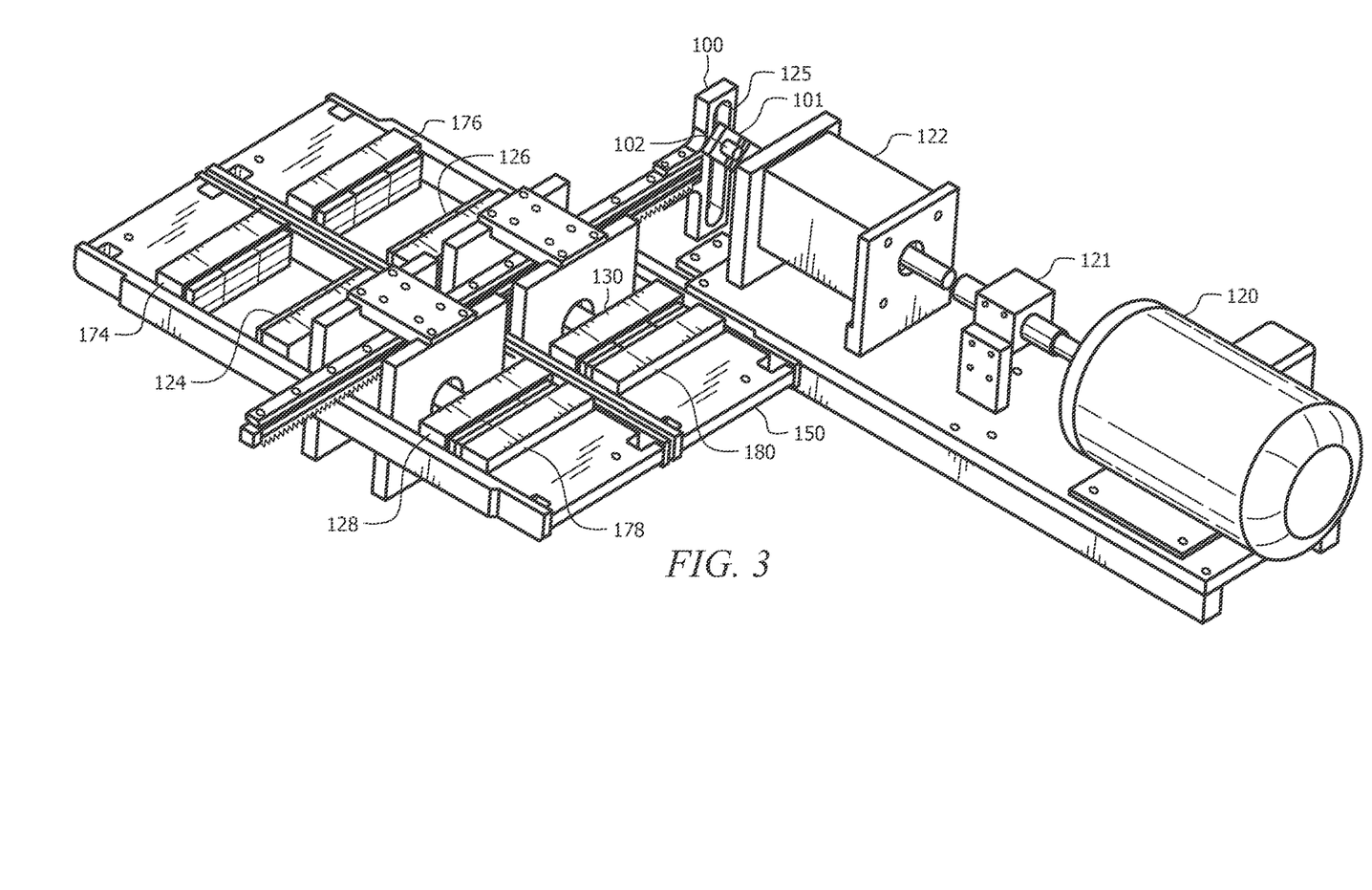
FIG. 3 is an illustration of a drive train comprising an input cam to provide a desired dwell time in combination with a magnetic linear shuttle, in accordance with an embodiment of the present invention.

FIG. 3 illustrates the magnetic drive system, which further includes a magnetic shuttle 150 that is confined to a linear reciprocating movement generally parallel to the first common axis 140 and second common axis 141. Affixed to the magnetic shuttle 150 are a plurality of stationary permanent magnets 174, 176, 178, 180. In this embodiment, the first stationary permanent magnet 174 is positioned opposite a first rotatable permanent magnet 124, a second stationary permanent magnet 176 is positioned opposite a second rotatable permanent magnet 126, a third stationary permanent magnet 178 is positioned opposite a third rotatable permanent magnet 128 and a fourth stationary permanent magnet 180 is positioned opposite a fourth rotatable permanent magnet 130. As shown, the first and second stationary permanent magnets 174, 176 and the third and fourth stationary permanent magnets 178, 180 are affixed to opposing first and second sides of the magnetic shuttle 150. Additionally, each of the stationary permanent magnets 174, 176, 178, 180 has a north pole and a south pole. The magnets are positioned such that rotation of the rotatable permanent magnets 124, 126, 128, 130 is coincident with a repelling and an attracting force of the stationary permanent magnets 174, 176, 178, 180 of the magnetic shuttle 150, resulting in the reciprocating movement of the magnetic shuttle 150. In operation, the electric motor 120 provides rotation of the rotatable permanent magnets 124, 126, 128, 130, which affects linear movement of the stationary permanent magnets 174, 176, 178, 180 and a reciprocating movement of the magnetic shuttle 150.

While the exemplary embodiments illustrated in FIG. 1-FIG. 3 show a fixed number of rotatable permanent magnets and stationary permanent magnets, this is not intended to be limiting and any number of magnets are within the scope of the present invention. Additionally, while the embodiments describe an electric motor, it is well understood that other well-known means for driving the rotation of the magnets may be employed, without departing from the invention.

In order to maximize the amount of rotationally to linearly (reciprocating) transferred energy, when the rotatable permanent magnets 124, 126, 128, 130 are rotated 180°, a dwell time is desirable to allow the magnetic shuttle 150 enough time to complete its reciprocating stroke. While it is known in the art to utilize an intermittent drive, or servo motor, to hold the rotatable permanent magnets 124, 126, 128, 130 in a constant position as the magnetic shuttle 150 completes its stroke, intermittent drives are more expensive and more complex than continuous drive motors, rendering their use undesirable.

To overcome the need for the use of intermittent drives or servo motors, in the present embodiment the dwell time is provided by the input cam 100, thereby allowing the use of a standard AC motor 120, which provides a continuous input rotation for the rotatable permanent magnets 124, 126, 128, 130. The use of the input cam 100 having a properly dimensioned recessed track 125 and a continuous drive motor 120 requires less energy and reduces the overhead of the magnetic drive assembly.

Figure 4:
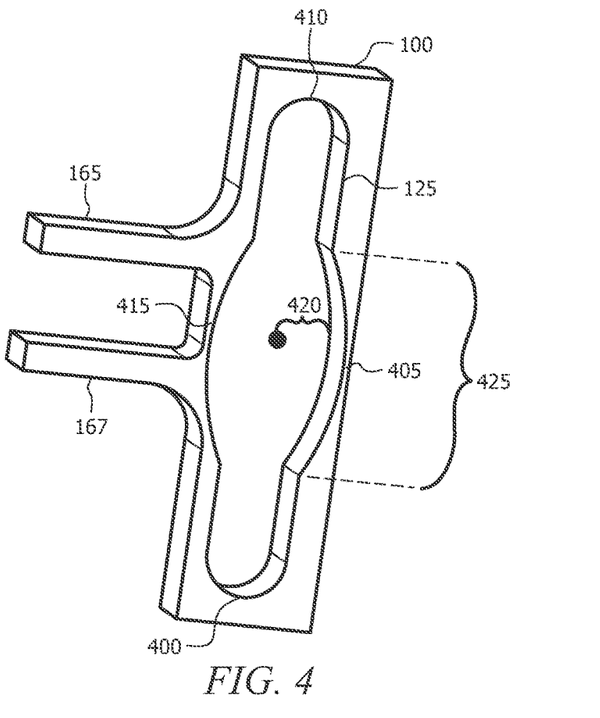
FIG. 4 is a detailed view of the recessed track of the input cam, in accordance with an embodiment of the present invention.

With reference to FIG. 4, the shape of the recessed track 125 of the input cam 100 establishes the dwell time for the rotatable permanent magnets 124, 126, 128, 130 when driven with a continuous motor 120. The legs 165, 167 of the input cam 100 are configured to be attached to the linear shaft 106 that rotates the rotatable permanent magnets 124, 126, 128, 130. The design of the recessed track 125 provides a sinusoidal movement with minimal movement at the end of the stroke of the magnetic shuttle 150, thereby providing the necessary dwell time to maximize the transferred energy. The specific dwell time can be controlled by the physical shape of the recessed track 125 of the input cam 100.

In determining the dimensions of the recessed track 125 of the input cam 100, the load and velocity of the magnetic shuttle 150 must be considered, as the dwell time should match the time of the magnetic shuttle 150 movement. More importantly, the dwell time established by the recessed track 125 should be sufficient enough to allow for maximum magnetic alignment of the rotatable permanent magnets 124, 126, 128, 130 and the fixed permanent magnets 174, 176, 178, 180 as the magnetic shuttle 150 moves through its stroke. In general, the dimensions of the recessed track 125 may vary based upon the specific application. In particular, the recessed track 125 is dimensioned to having a portion 425 that establishes the necessary dwell time.

In a particular embodiment, the dwell time provided by the input cam 100 may be achieved by matching the width 405 of the recessed track 125 at the 90° position 400 and 270° position 415 to a swing of the crank arm 101 swing. As shown in FIG. 4, the width of the recessed track 125 of the input cam 100 at the 0° position 400 and 180° position 410 is substantially equal to a diameter of the cam roller 102, and the width of the recessed track 125 at the 90° 405 and the 270° position 415 is substantially equal to a swing of the crank arm 101.

Figure 5:
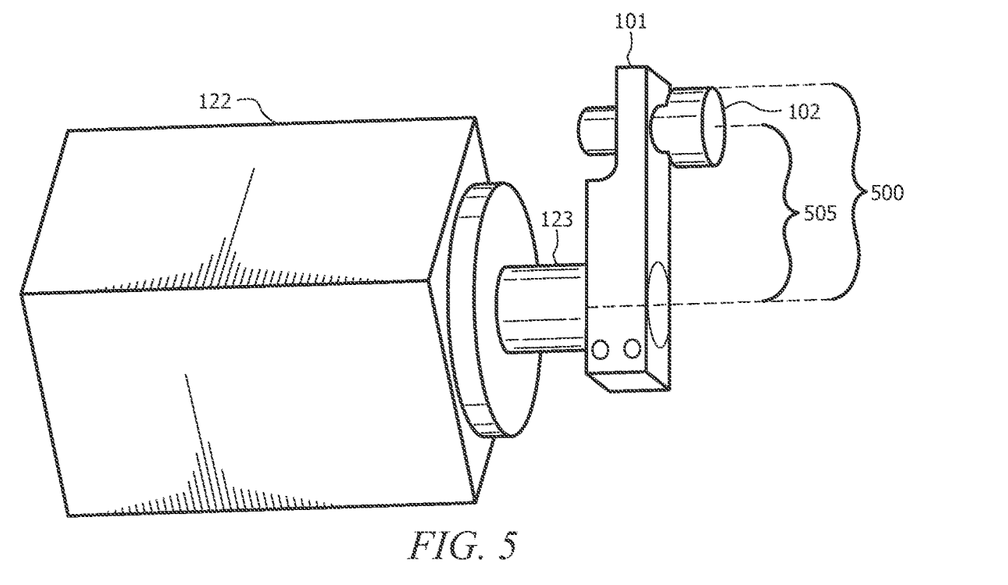
FIG. 5 is a detailed view of the cam, cam roller, crank arm and crank shaft of the input cam, in accordance with an embodiment of the present invention.

FIG. 5 provides a more detailed view of the cam shaft 123, cam arm 101 and cam roller 102 of the present invention. As shown in FIG. 5, the cam shaft 123 is driven by an output from the gear reducer 122. The cam roller 102 is positioned within the recessed track 125 of the input cam 100, as previously described with reference to FIG. 1-FIG. 4. The swing of the crank arm 101 is determined as the distance 500 from the center of the crank arm 101 to the outside diameter of the cam roller 102. Additionally, the throw of the cam is the distance of movement of the cam arm 101, which is twice the distance 505 from the center of the crank shaft 102 to the center of the cam roller 102 on the crank arm 101.

Accordingly, as shown in FIG. 1-FIG. 5, in one embodiment, the present invention provides an improved magnetic drive train whereby an input cam 100 and a continuous drive motor 120 are used to harvest the maximum amount of energy when converting the rotary motion of the rotatable permanent magnets 124, 126, 128, 130 to the reciprocating motion of the magnetic shuttle 150.

Figure 6:
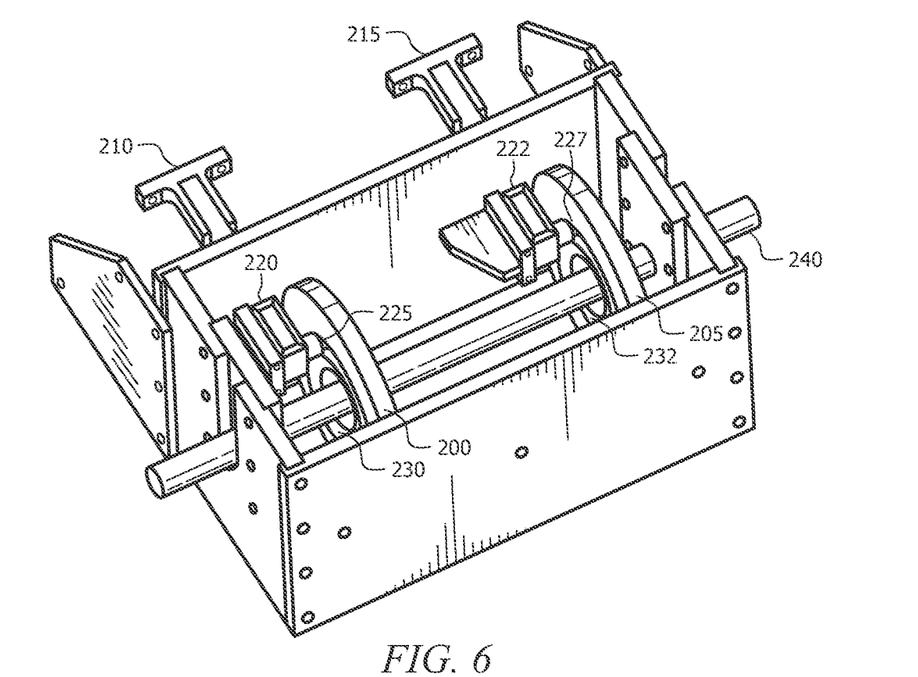
FIG. 6 is an illustration of a drive train comprising an output cam for harvesting the energy from a linear magnetic shuttle, in accordance with an embodiment of the present invention.

In a second embodiment, the reciprocating linear motion of the magnetic shuttle 150 may be converted back to a rotary motion. As shown in FIG. 6, two output cams 200, 205 are coupled to the magnetic shuttle 150 using shuttle attachment brackets 210, 215. In particular, the shuttle attachment brackets 210, 215 are attached to the magnetic shuttle 150 on one side of the shuttle bracket 150, as shown in FIG. 3. In operation, the cams 200, 205 are used to harvest the energy from the magnetic driven linear shuttle 150.

As illustrated in FIG. 6, an output shaft 240 is driven by the rotational movement of the two output cams 200, 205. The movement of the magnetic shuttle 150 causes linear movement of the linear input shaft 220, 222 coupled to each of the two output cams 200, 205, respectively. Each linear input shaft 220, 222 includes a cam roller 225, 227 that is positioned with a recessed track 230, 232 of each of the corresponding output cams 200, 205. The dimensions of the recessed track 230, 232 of the output cams 200, 205 controls the movement of the output shaft 240.

The objective of the shape of the recessed track 230, 232 provided by the output cams 200, 205 is to allow the efficient capture of energy of the linear motion of the magnetic shuttle 150 that is powered by the interaction between the permanent magnets of the magnetic shuttle 150 and the rotatable permanent magnets, as previously described with reference to the first embodiment. The force curve of a linear motion magnetic system, such as the magnetic shuttle 150, is affected by the magnetic gap as it moves through its path. The desired output for an application varies and the design of the recessed track 230, 232 of the output cams 200, 205 allows for modification of the output force and velocity. Accordingly, the inertia of the mechanical system, velocity and magnetic forces can be controlled by the shape of the recessed track 230, 232 of the output cams 200, 205.

Figure 7:
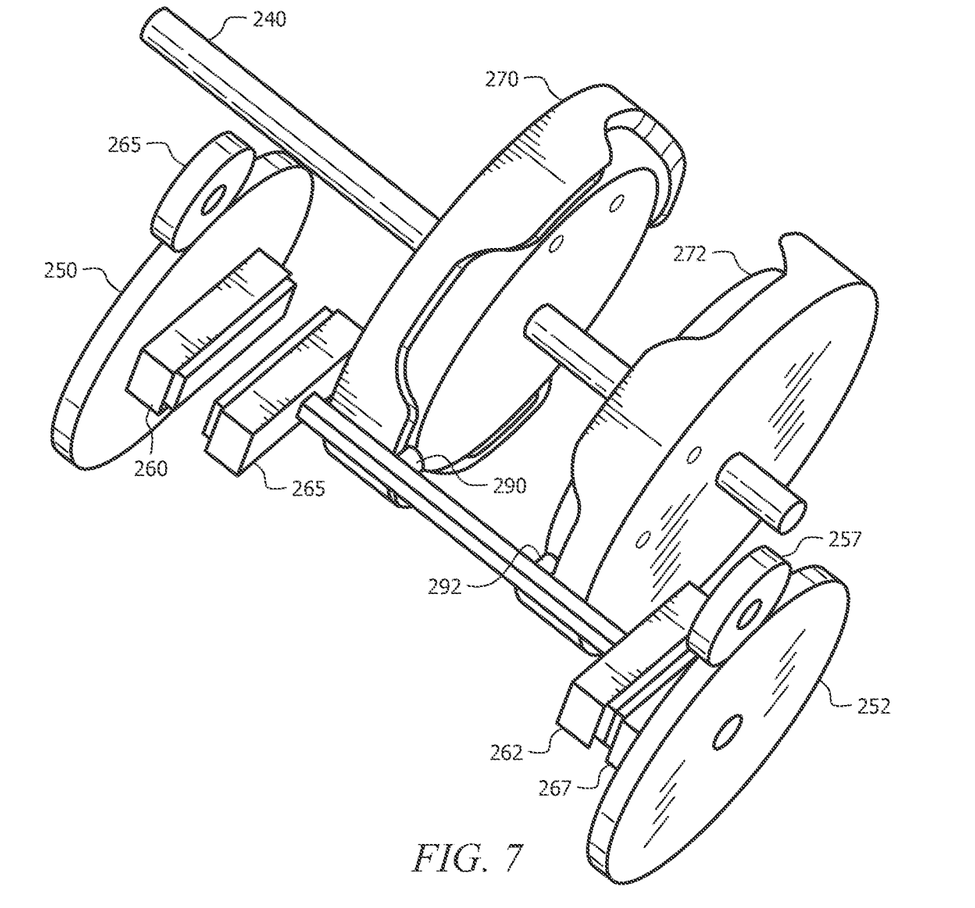
FIG. 7 is an illustration of a drive train comprising an output barrel cam for harvesting the energy from a linear magnetic shuttle, in accordance with an embodiment of the present invention.

In the embodiment illustrated in FIG. 6, the output shaft 240 is perpendicular to the motion of the linear shaft 220, 222. However, as shown in FIG. 7, it may be desirable to change the orientation to be in the same plane as the linear motion of the axis of the linear shaft 220, 222. To achieve the configuration illustrated in FIG. 7, a barrel type output cam 270, 272 can be used with multiple axes. In this embodiment, the barrel cams 270, 272 rotate an output shaft 240, wherein each of the barrel cams 270, 272 are driven by a combination of a drive gear 255, 257, axis rotational gear 250, 252, fixed magnet 260, 262, and rotating magnet 265, 267. As in the embodiment shown in FIG. 6, the cam rollers 290, 292 in the embodiment of FIG. 7 trace along the recessed track of the barrel output cams 270, 272 to provide the desired velocity output.

Figure 8:
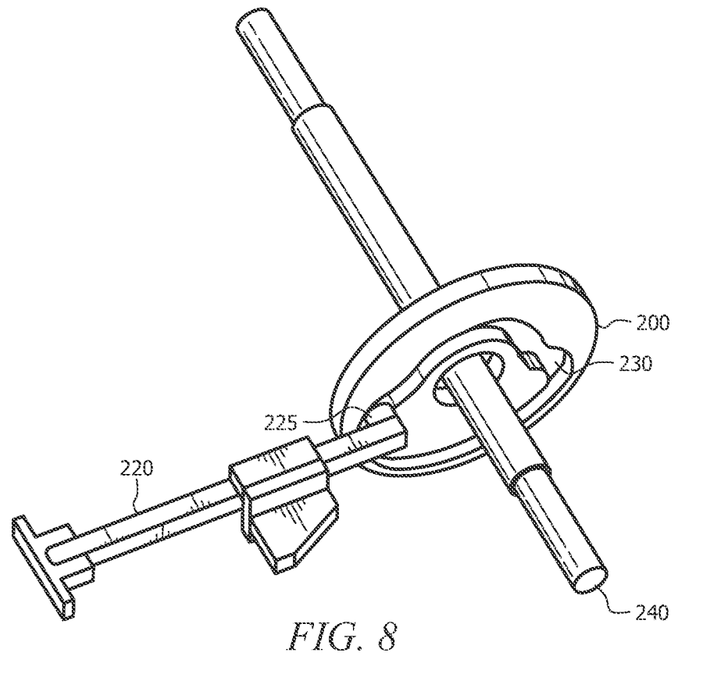
FIG. 8 is a detailed view of an output cam and movement mechanism, in accordance with an embodiment of the present invention.

The relationship between the cam, the cam roller and the linear shaft 220 of one of the output cams 200 of FIG. 7 is more clearly illustrated in FIG. 8. As shown in FIG. 8, the output shaft 240 is driven by the output cam 200, and the rotational motion of the output cam 200 is provided by the cam roller 235 of the linear shaft 220 traveling along the recessed track 230 of the output cam 200.

Figure 9:
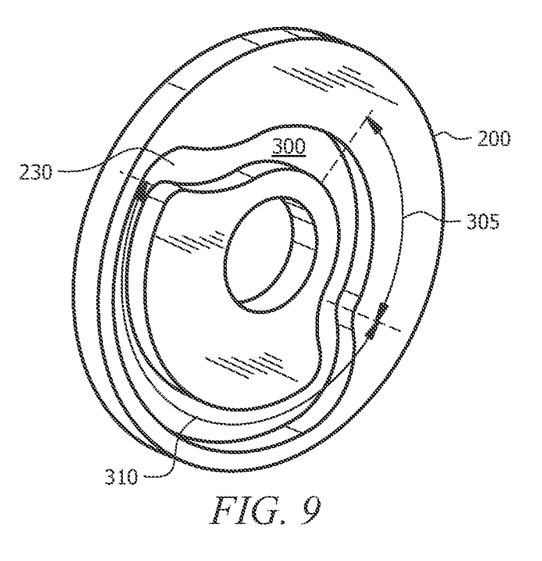
FIG. 9 is a detailed view of the recessed track of the output cam, in accordance with an embodiment of the present invention.

FIG. 9 additionally illustrates an exemplary shape of the recessed track 230 of the output cam 200. In the present invention, the recessed track 230, 232 of the output cams 200, 205 are dimensioned to capture the energy of the magnetic shuttle 150 and to transfer it to a rotary motion. The shuttle movement is caused by the magnetic forces, wherein the force curve during its stroke is "U" shaped. This resulting force curve is inherent in a magnetic system and can result in mechanical failures at the end of the stroke, where the force is at its peak and overpowers the load. As described, the resulting force curve, without use of the output cams 200, 205 will not be flat, but instead will be at its lowest level near the center of the stroke of the magnetic shuttle 150 and at its peak level at the end of the stoke. This is not ideal, and it is desirable to have a constant force curve from the movement of the magnetic shuttle 150. In the present invention, to help achieve a constant force curve on the output, the output cam 200, 205 has been introduced.

The dimensions of the recessed track 230 of the output cam 200 shown in FIG. 9 include a constant negative acceleration area 300 a constant positive acceleration area 305 and a constant velocity area 310. The negative acceleration area 300 of the recessed track 230 should change the velocity to allow the load to slow the shuttle velocity as it nears the end of the stroke. The inertia of the moving load thus enters into the design of the slope of the recessed track at the end of the stroke. Additionally, the center of the stroke is the minimum force of the magnets and the slope of the recessed track of the cam should be a constant velocity in this area of the track. In a particular embodiment, assuming that the input motion to rotate the magnets is 180°, the recessed track of the output cam 200, 205 will determine the magnetic drive ratio (degrees per stroke).

The recessed tracks shown in FIG. 8 and FIG. 9 are illustrative of these desired conditions. Additionally, the output cams 200, 205 keep the magnetic shuttle 150 from drifting from the end of the stroke, as the magnets are rotated for the next stroke. The significance of this is to maximize the effectiveness of the full stroke of the magnetic shuttle 150. In general, the shape of the lobes of the recessed track of the output cams, along with the stroke of the magnetic shuttle, are variables to be determined based upon the application and the size of the magnets.

The output cams 200, 205 as illustrated in the exemplary embodiments provide a constant acceleration for the first 20% of the shuttle stroke, a constant velocity through the next 50%, and a constant negative acceleration for the remaining 30%. However, these parameters can be altered depending upon the application, while providing the same result, which is to maximize the harnessing of the shuttle energy and to apply the harnessed energy into the rotary output.

In the present invention, the output cam is used to provide a constant force curve and to change the velocity at the end of the reciprocating stroke. The end of the reciprocating stroke is the peak of the force curve, which will increase the velocity, if the load is not changed. Contrary to most cam designs in which the recessed track is shaped to provide a preferred output motion, in the present invention, the recessed track of the cam is shaped to control the output force and input velocity.

Additionally, adding a flywheel load to store the energy in either of the embodiments shown in FIG. 7 or FIG. 8, reduces the velocity at the highest energy portion of the linear stroke. Utilizing a flywheel increases the reliability and efficiency of the linear system and the energy to decrease the velocity is stored in the flywheel for output use.

It will be seen that the advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A camshaft arrangement for transforming a reciprocating input to a rotational output, the camshaft arrangement comprising: an output cam having a recessed track to engage a cam roller of a reciprocating shaft, wherein a force produced by the reciprocating shaft fluctuates during a reciprocating stroke of the reciprocating shaft; wherein the recessed track of the output cam is dimensioned to reduce the fluctuation in the force produced by the reciprocating shaft during the reciprocating stroke; a shuttle coupled to the reciprocating shaft, the shuttle comprising a plurality of fixed permanent magnets, the plurality of fixed permanent magnets positioned such that a rotation of a plurality of rotatable permanent magnets causes an alternate repelling force and attracting force on the plurality of fixed permanent magnets that results in the reciprocating stroke of the reciprocating shaft.

2. The camshaft arrangement of claim 1, wherein the recessed track of the output cam is dimensioned to maximize a transformation of energy generated by the reciprocating stroke of the reciprocating shaft to a rotational output.

3. The camshaft arrangement of claim 1, wherein the recessed track of the output cam is dimensioned to provide a constant positive acceleration portion, a constant velocity portion and a constant negative acceleration portion.

4. The camshaft arrangement of claim 3, wherein the constant positive acceleration portion of the recessed track of the output cam comprises approximately 20% of the recessed track.

5. The camshaft arrangement of claim 3, wherein the constant velocity portion of the recessed track of the output cam comprises approximately 50% of the recessed track.

6. The camshaft arrangement of claim 3, wherein the constant negative acceleration portion of the recessed track of the output cam comprises approximately 30% of the recessed track.

7. The camshaft arrangement of claim 1, further comprising:
an output shaft coupled to the output cam, the output cam to rotate the output shaft in response to the reciprocating stroke of the reciprocating shaft; and
a flywheel coupled to the output shaft.

8. The camshaft arrangement of claim 1, wherein the camshaft arrangement is coupled to a magnetic drive train apparatus, and wherein the magnetic drive train apparatus comprises:
a plurality of rotatable permanent magnets, each of the rotatable permanent magnets having a north pole and an opposing south pole aligned within a plane;
a plurality of first rotational shafts, wherein each one of the plurality of rotatable permanent magnets is rotatable by a respective one of the plurality of first rotational shafts about an axis within the plane and between the opposing poles;
a first reciprocating shaft coupled to the plurality of first rotational shafts;
a crank arm having a cam roller positioned at a first end of the crank arm;
an input cam coupled to the first reciprocating shaft, the input cam comprising a recessed track to engage the cam roller of the crank arm, wherein a rotation of the crank arm results in a reciprocating stroke of the first reciprocating shaft perpendicular to the axis and in the corresponding reciprocating stroke of the shuttle parallel to the axis;
a second reciprocating shaft coupled to the shuttle, the second reciprocating shaft comprising a cam roller; and
wherein the recessed track of the output cam engages the cam roller of the second reciprocating shaft, wherein reduces the fluctuation in the force produced by the reciprocating shaft during the reciprocating stroke of the second reciprocating shaft.

9. The camshaft arrangement of claim 8, wherein the recessed track of the input cam is dimensioned to establish a dwell time during the reciprocating stroke of the first reciprocating shaft.

10. A magnetic drive train apparatus comprising:
a plurality of rotatable permanent magnets, each of the rotatable permanent magnets having a north pole and an opposing south pole aligned within a plane;
a plurality of first rotational shafts, wherein each one of the plurality of rotatable permanent magnets is rotatable by a respective one of the plurality of first rotational shafts about an axis within the plane and between the opposing poles;
a first reciprocating shaft coupled to the plurality of first rotational shafts;
a shuttle comprising a plurality of fixed permanent magnets affixed to a shuttle, the plurality of fixed permanent magnets positioned such that a rotation of the plurality of rotatable permanent magnets causes an alternate repelling force and attracting force on the plurality of fixed permanent magnets that results in a reciprocating stroke of the shuttle parallel to the axis;
a crank arm having a cam roller positioned at a first end of the crank arm;
an input cam coupled to the first reciprocating shaft, the input cam comprising a recessed track to engage the cam roller of the crank arm, wherein a rotation of the crank arm results in a reciprocating stroke of the first reciprocating shaft perpendicular to the axis and in the corresponding reciprocating stroke of the shuttle parallel to the axis and wherein the recessed track is dimensioned to establish a dwell time during the reciprocating stroke of the first reciprocating shaft;
a second reciprocating shaft coupled to the shuttle, the second reciprocating shaft comprising a cam roller; and
an output cam having a recessed track to engage the cam roller of the second reciprocating shaft, wherein a force produced by the reciprocating shaft fluctuates during a reciprocating stroke of the reciprocating shaft and wherein the recessed track of the output cam is dimensioned to reduce the fluctuation in the force produced by the reciprocating shaft during the reciprocating stroke of the second reciprocating shaft.

11. The camshaft arrangement of claim 8 wherein the magnetic drive train apparatus further comprises a crank shaft coupled to the crank arm and a continuous drive motor coupled to the crank shaft to provide the rotation of the crank arm.

12. The camshaft arrangement of claim 9, wherein the dwell time established by the recessed track of the input cam is sufficient to allow the shuttle to complete its reciprocating stroke.

13. The camshaft arrangement of claim 8, wherein the recessed track of the output cam is dimensioned to provide a constant positive acceleration portion, a constant velocity portion and a constant negative acceleration portion.

14. A camshaft arrangement for transforming a reciprocating input to a rotational output, the camshaft arrangement comprising:
a reciprocating shaft configured to provide the reciprocating input, wherein the reciprocating shaft has a reciprocating stroke between a first end of the reciprocating stroke and a second end of the reciprocating stroke and a force produced by the reciprocating shaft fluctuates during a reciprocating stroke of the reciprocating shaft;
an output cam having a recessed track to engage a cam roller of reciprocating shaft, wherein the recessed track is configured to reduce the fluctuation in the force produced by the reciprocating shaft during the reciprocating stroke; a shuttle coupled to the reciprocating shaft, the shuttle comprising a plurality of fixed permanent magnets, the plurality of fixed permanent magnets positioned such that a rotation of a plurality of rotatable permanent magnets causes an alternate repelling force and attracting force on the plurality of fixed permanent magnets that results in the reciprocating stroke of the reciprocating shaft.

15. The camshaft arrangement of claim 14, wherein the recessed track of the output cam is dimensioned to maximize a transformation of energy generated by the reciprocating stroke of the reciprocating shaft to a rotational output.

16. The camshaft arrangement of claim 14, wherein the recessed track of the output cam is dimensioned to provide a constant positive acceleration portion, a constant velocity portion and a constant negative acceleration portion.

17. The camshaft arrangement of claim 3, wherein constant positive acceleration portion of the recessed track of the output cam comprises approximately 20% of the recessed track.

18. The camshaft arrangement of claim 3, wherein the constant velocity portion of the recessed track of the output cam comprises approximately 50% of the recessed track.

19. The camshaft arrangement of claim 3, wherein the constant negative acceleration portion of the recessed track of the output cam comprises approximately 30% of the recessed track.

\* \* \* \* \*